Nov. 2, 1965   C. O. LEYDIG ETAL   3,214,895
TREE TOPPER WITH TELESCOPING TOWER AND OSCILLATING BOOM
Filed Aug. 29, 1963                          3 Sheets-Sheet 2

INVENTORS
CLYDE O. LEYDIG
YIGAL MICHELSON
BY William R. Piper
ATTORNEY

Nov. 2, 1965  C. O. LEYDIG ETAL  3,214,895
TREE TOPPER WITH TELESCOPING TOWER AND OSCILLATING BOOM
Filed Aug. 29, 1963  3 Sheets-Sheet 3
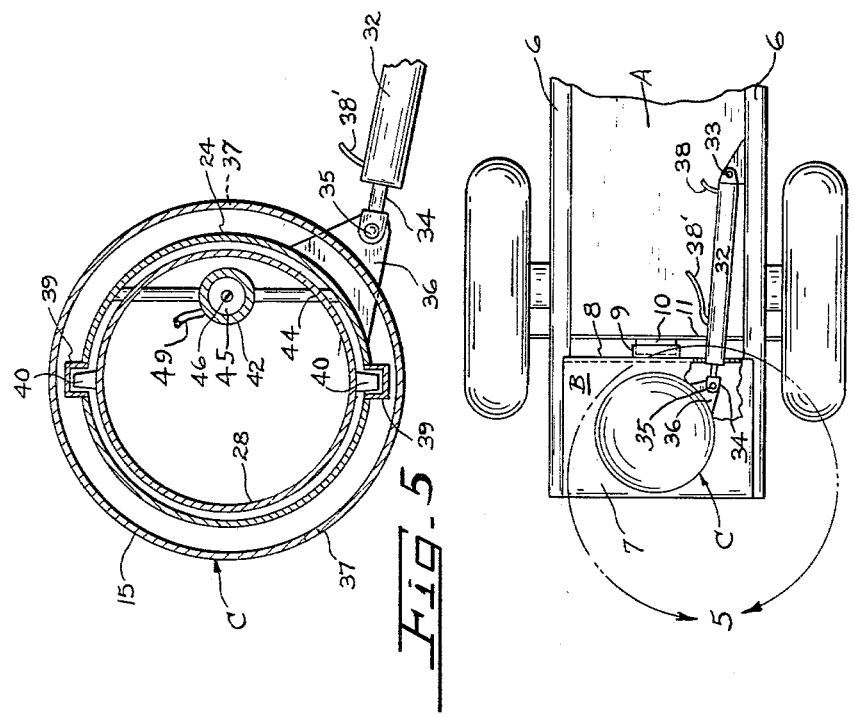
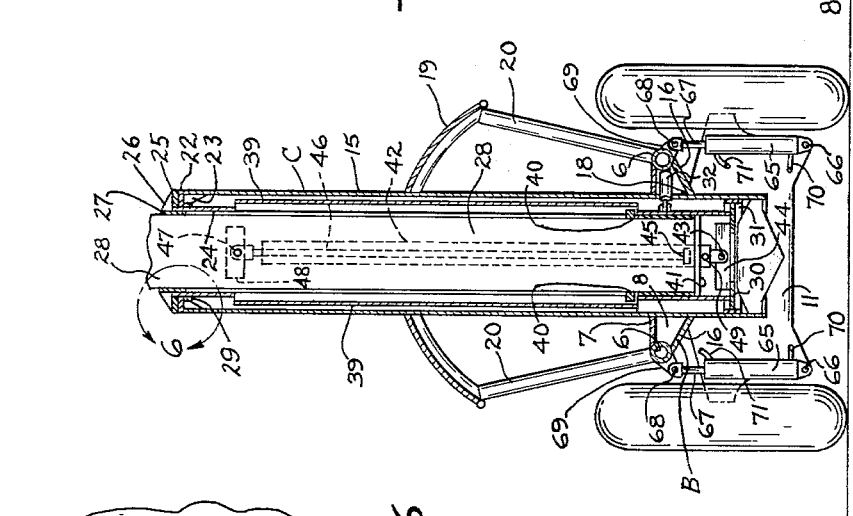
INVENTORS
CLYDE O. LEYDIG
YIGAL MICHELSON
BY William R. Piper
ATTORNEY United States Patent Office 3,214,895
Patented Nov. 2, 1965

3,214,895
TREE TOPPER WITH TELESCOPING TOWER
AND OSCILLATING BOOM
Clyde O. Leydig and Yigal Michelson, both of Box 276,
Exeter, Calif.
Filed Aug. 29, 1963, Ser. No. 305,436
9 Claims. (Cl. 56—235)

The present invention relates to improvements in a tree topper with telescoping tower and oscillating boom and it consists in the combinations and arrangement of parts hereinafter described and claimed.

An object of our invention is to provide a tree topper with telescoping tower and oscillating boom which may be mounted on a powered vehicle, such as a tractor. The device is compact and its center of gravity is low. The device is rotatably supported at the front and back of the tractor and it may be tilted laterally as a unit and in either direction from a vertical position.

A further object of our invention is to provide a device of the type described in which a vertical telescoping tower carries a horizontal and radially-extending boom at its upper end. Means is controlled by an operator for extending the tower for raising the boom to the desired height above the ground. An oscillating, cutter blade carrying boom is pivotally secured at the outer end of the radially extending boom and the operator has means for controlling the amplitude of swing of the oscillating boom and for controlling the angular position of the radially extending boom with respect to the tractor. It is possible to swing the radial boom into inoperative position which is in a line to coincide with a longitudinal central vertical plane extending from the front to the back of the tractor.

A further object of our invention is to provide a device of the type described which is relatively simple in construction and is durable and efficient for the purpose intended.

Other objects and advantages will appear as the specification continues. The novel features of the invention will be set forth in the appended claims.

Drawings

For a better understanding of our invention, reference should be made to the accompanying drawings, forming part of this specification, in which:

FIGURE 3 is a vertical transverse section taken along the line 3—3 of FIGURE 1, and shows the telescoping tower in section.

FIGURE 4 is a horizontal section taken along the line 4—4 of FIGURE 1, and omits showing the detailed section of the telescoping tower because the scale is too small.

FIGURE 5 is a horizontal section through the telescoping tower and is an enlargement of the dot-dash circled portion 5 shown in FIGURE 4.

FIGURE 6 is an enlarged vertical section of the dot-dash circled portion 6 shown in FIGURE 3.

While we have shown only the preferred form of our invention, it should be understood that various changes, or modifications, may be made within the scope of the annexed claims without departing from the spirit thereof.

Detailed description

Figure 1:
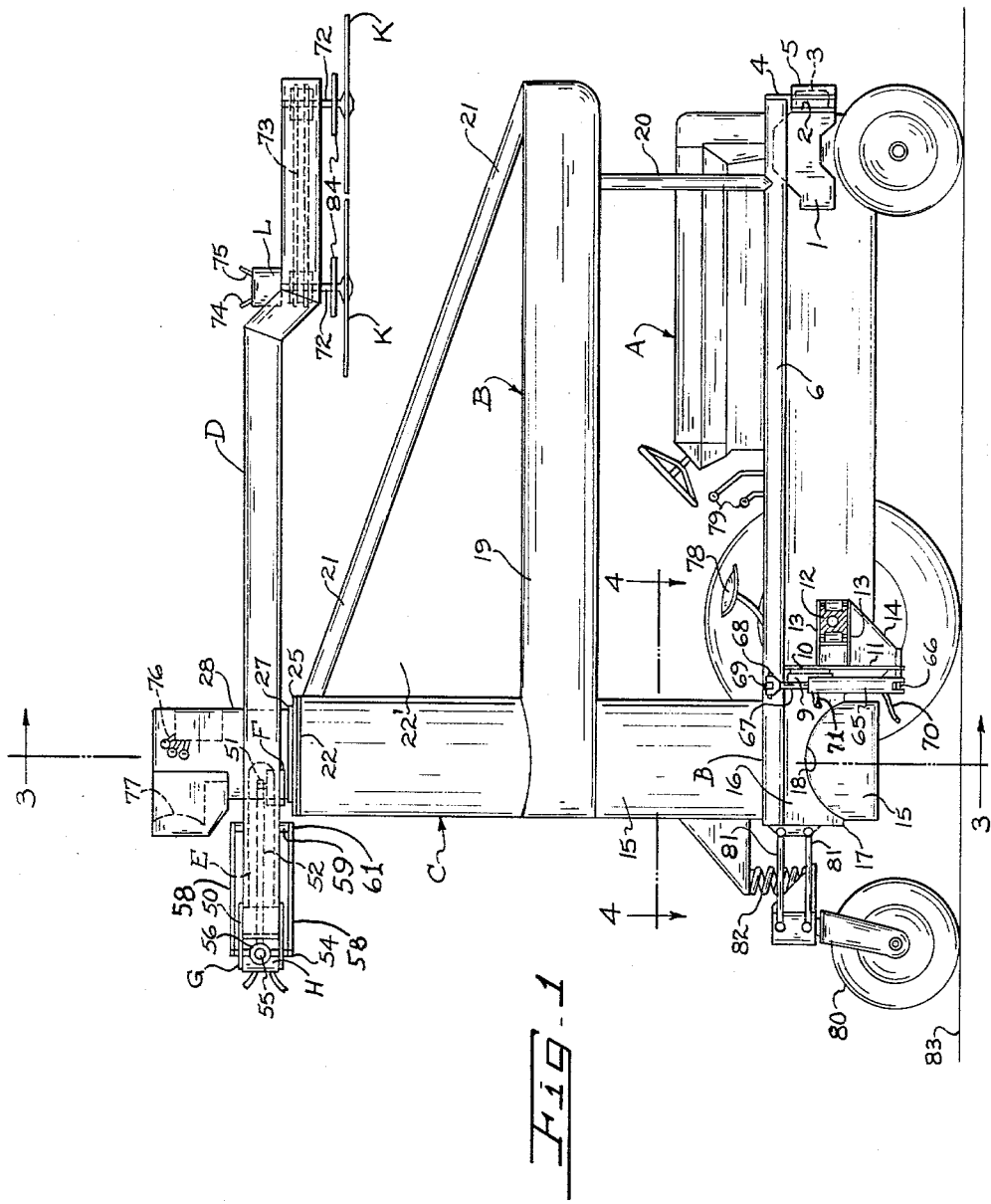
FIGURE 1 is a side elevation of our device and it is shown mounted upon a tractor.
Figure 2:
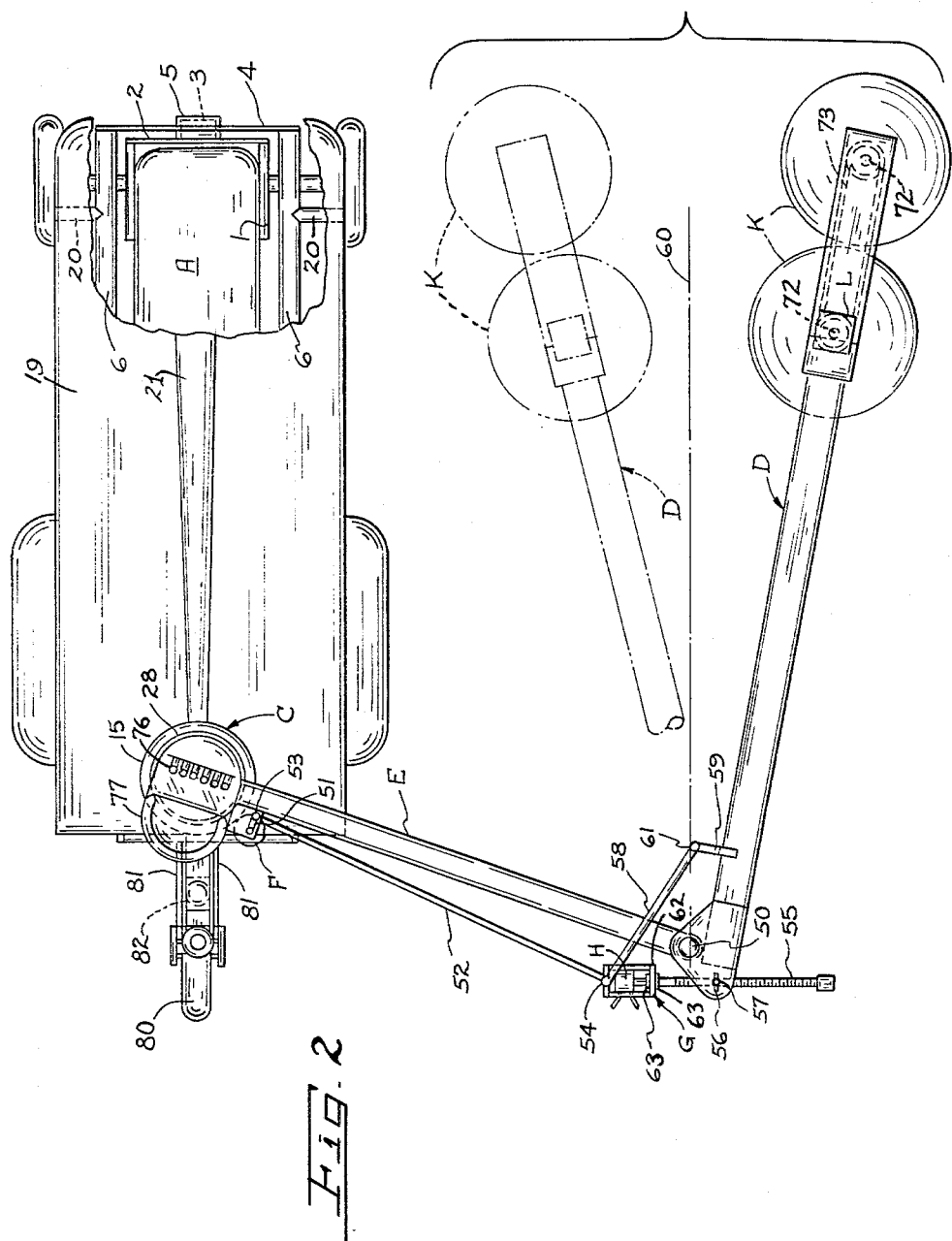
FIGURE 2 is a top plan view of FIGURE 1.

In carrying out our invention, we make use of a powered unit such as the tractor indicated generally at A in FIGURE 1. At the front of the tractor we mount a U-shaped frame 1 that has a transversely extending plate 2. The plate has a forwardly extending cylindrical bearing 3 that is centrally disposed with respect to the sides of the tractor. Both FIGURES 1 and 2 show a front plate support 4 for our device and this support has a central cylindrical bearing 5 that is rotatably mounted on the cylindrical bearing 3.

A pair of parallel side pipes 6 have their front ends welded or otherwise secured to the front pivot plate 4. FIGURES 3 and 4 show the rear ends of the parallel side pipes welded to a horizontal and transversely extending plate 7. The plate 7 in turn has its front edge welded to a vertical and transversely extending bearing carrying plate 8. FIGURE 4 shows the vertical plate 8 as having a centrally disposed cylindrical bearing 9 that is rotatably mounted on an inner bearing 10. The bearing 10 is carried by a transversely extending rear plate 11 that is bolted or otherwise secured to the tractor A. Both of the bearings 3 and 10 have their axes lying on a common central axis that extends from the front to the rear of the tractor A. The front plate 4, rear plate 11, rear cross plates 7 and 8, and the parallel side pipes 6, constitute a tower-supporting frame B that is pivotally supported by the bearings 3 and 10 and can be swung as a unit about these bearings.

FIGURE 1 illustrates how the rear plate 11 may be supported by the rear axle housing 12 for the tractor A. The rear plate 11 has forwardly extending supporting members 13 that extend above and below the axle housing and may be secured thereto. A truss 14 extends from the lower supporting member to the bottom of the rear plate 11 and may be welded to the plate. We will describe hereinafter how the operator can tilt the tower-supporting frame B, laterally for a particular purpose.

Telescoping tower

The telescoping tower is indicated generally at C in FIGURE 1. In FIGURE 3 the telescoping tower is shown comprising an outer cylindrical and vertically extending housing 15. The horizontal plate 7 has a central opening for receiving the housing 15 and the housing is welded to the rim of the opening. In addition, we provide reinforcing inclined plates 16 that extend from the parallel pipes 6, downwardly at an angle and toward each other so as to meet at a common vertex 17, see FIGURE 1. The two inclined plates 16 have arcuate recesses 18 therein forming a cylindrical opening for receiving the outer cylindrical casing 15 of the telescoping tower C. The front edges of the inclined plates 16 are welded to the vertical plate 8 and cooperate therewith and with the horizontal plate 7 for forming a supporting base frame for the telescoping tower.

The outer cylindrical casing 15 is further reinforced by an arcuate-shaped cover 19, see FIGURE 3, that extends forwardly from the casing to the front of the tractor A, see FIGURE 1. We provide supports 20 for the front of the cover 19 that extend from the cover and downwardly to the parallel and horizontally disposed pipes 6. The cover 19 not only protects the operator of the tractor, but also acts with the forward supports or struts 20, as an additional reinforcing and stabilizing means for the telescoping tower C.

Another reinforcing and bracing pipe 21 for the telescoping tower C, extends from the top of the cylindrical vertical housing 15 to the front of the cover 19, see FIGURE 1. A reinforcing metal web 22', is triangular in shape and is welded to the pipe 21, the cover 19 and to the outer housing or casing 15. The pipe 21 and web 22' serve the additional function of separating falling cut branches and other debris that strike the inclined pipe 21 and causing this falling material to drop onto the downwardly curved portions of the cover 19 where they will continue in their movement and drop onto the sides of the tractor. This will prevent cut branches from piling up onto the top of the cover 19 and stacking up in front of the cylindrical housing 15 of the telescoping tower C.

In FIGURE 3, we show the top of the cylindrical vertical housing 15 as extending a considerable distance above the cover 19. An enlarged sectional view in FIGURE 6, shows the top of the cylindrical housing 15 supporting a horizontal ring-shaped bearing plate 22. Gussett plates 23 are welded to the undersurface of the ring bearing plate 22 and to the inner surface of the cylindrical housing 15. This structure provides a support for an inner rotatable cylinder 24 that extends substantially throughout the length of the outer cylindrical housing 15.

The top of the inner rotatable cylinder 24 has a ring-shaped supported bearing plate 25 welded or otherwise secured thereto and this bearing plate is supported by the stationary bearing plate 22, see FIGURES 3 and 6. Gussett plates 26 are welded to the top of the bearing ring 25 and are also welded to the outer surface of a centering ring 27 for the telescoping inner cylindrical member 28 of the tower C. The ring-shaped supporting bearing plate 22 has an inner ring 29 welded thereto and this ring receives the adjacent outer surface of the rotatable cylinder 24.

It will be seen from FIGURE 3, that the inner rotatable cylinder 24 has a bottom disc-shaped plate 30 which in turn carries a guide ring 31 that bears against the inner surface of the outer cylindrical housing 15. The rotatable inner cylinder 24 is therefore supported by the outer cylindrical housing 15 and is free to rotate within this housing. The guide rings 29 and 31 keep the axis of the inner cylinder 24 aligned with the axis of the outer cylindrical housing 15.

We provide means for rotating the inner cylinder 24 through an arc of about 90°. One way of accomplishing this is illustrated in FIGURES 3, 4 and 5. A hydraulic cylinder 32 has one end pivotally secured at 33 to one of the horizontal pipes 6. The cylinder 32 has a piston, not shown, slidably mounted therein, and a piston rod 34 extends from the piston and projects beyond the cylinder and is pivoted at 35 to a bracket 36 that projects outwardly from the inner cylinder 24. The bracket 36 extends through a slot 37 provided in the outer cylindrical housing 15. When fluid is admitted into the cylinder 32 through a conduit 38, see FIGURE 4, the piston in the cylinder is moved for extending the piston rod 34, and moving the bracket 36 for rotating the inner cylinder 24, clockwise in FIGURE 5. When fluid is admitted to the cylinder 32 through a conduit 38', a counter-clockwise rotation of the inner cylinder 24 will result. The purpose for rotating the inner cylinder 24 through an arc of 90° or less will be explained later.

We will now describe how the inner telescoping member 28 can be moved axially with respect to the rotating cylinder 24 and how the member 28 is rotated when the cylinder 24 is rotated. In FIGURES 3 and 5 we show the rotating cylinder 24 provided with a pair of longitudinally extending and diametrically opposed slots that receive inwardly facing channel-iron guides 39. The inner telescoping member 28 carries outwardly projecting keys 40 that are slidably received in the channels 39. The bottom of the inner telescoping member 28 has a disc-shaped bottom guide member 41 that slides on the inner surface of the rotatable cylinder 24 when the member 28 is moved vertically. The upper portion of the inner telescoping member 28 slides in the guide ring 27.

Any means desired may be used for raising or lowering the inner telescoping member 28. We show a hydraulic cylinder 42 whose lower end is pivotally connected at 43 to a cross member 44 that has its ends supported on the bottom plate 30 for the rotating cylinder 24. A piston 45 is slidably mounted in the cylinder 42 and a piston rod 46 extends upwardly from the piston and has its upper end pivotally connected at 47 to a cross piece 48 whose ends are welded to the inner surface of the hollow inner telescoping member 28, see FIGURE 3. A conduit 49 communicates with the lower end of the hydraulic cylinder 42 and fluid entering the cylinder through this conduit will move the piston 45 and piston rod 46, upwardly to raise the inner telescoping member 28 of the tower C. The reverse movement takes place when the conduit 49 permits fluid to leave the cylinder 42. The vertical movement of the inner telescoping member 28 can take place regardless of the angular position of the rotatable cylinder 24.

*Oscillating boom*

In FIGURES 1 and 2, we show how an oscillating boom indicated generally at D is pivotally connected at 50 to a horizontal boom E that in turn extends radially from and is supported by the upper end of the inner telescoping member 28 of the tower C. The boom E is shown in operative position in FIGURE 2. It is possible for the operator to swing the boom E clockwise in FIGURE 2, until its axis is in alignment with a vertical and longitudinal plane that includes the axes of the front bearing 3 and the rear bearing 10. The boom E can also be stopped at any desired angular position between inoperative and a position where the boom will extend at right angles to the direction of travel of the tractor A.

We illustrate one means for oscillating the boom D and for changing the magnitude of its swing. In FIGURE 2, we show a hydraulic motor F and reduction gearing, not shown, for slowly rotating a crank arm 51. A pitman 52 has one end pivotally connected to the crank arm at 53 and has its other end formed with a T which is pivotally connected at 54 to a frame G. The frame carries a reversible hydraulic motor H that rotates a screw shaft 55 in either direction. The screw shaft is received in a threaded sleeve 56 that is pivotally carried by the boom D at 57 and near to the pivot 50. A pair of links 58 are connected to the pivot points 54 and are pivotally connected to a clevis 59 that in turn is secured to the oscillating boom D.

In FIGURE 2, it will be apparent that a rotation of the crank arm 51 will reciprocate the pitman 52. The pitman in turn will reciprocate the frame G and screw 55 as a unit. Since the screw 55 is received in the threaded sleeve 56 and since the sleeve is pivotally connected to the boom D, at 57, the reciprocation of the screw 55 will oscillate the boom D about its pivot 50 and swing the boom into the double-dot-dash line position shown in FIGURE 2. The rotation of the crank arm 51 will swing the boom D to as great an angle on one side of a line 60 drawn through the pivot 50 and paralleling a longitudinal axis through the tractor A, as it will swing the same boom to make the same angle on the other side of the line 60.

The magnitude of the swinging of the boom D can be controlled as the tower boom E is swung into different angular positions and the pivot 50 is disposed at different distances from the side of the tractor A. If the horizontal boom E is swung clockwise about the tower C, until the boom extends at right angles to the common longitudinal axis of the bearings 3 and 9 in FIGURE 2, then the pivot 50 between the boom E and the oscillating boom D, will be positioned to pass over the centers of trees as the tractor A, moves along an aisle separating two adjacent parallel rows of trees. A full stroke cutting position for the oscillating boom D can be effected by actuating the hydraulic motor H for rotating the screw shaft 55 that will move the threaded sleeve 56 as close to the frame G as possible. This will shorten the distance between the sleeve 56 and the pivot 54 and in effect bring the pivot 54 closed to the pivot 50. If now the hydraulic motor F is actuated, it will rotate the crank arm 51 and reciprocate the pitman 52 and cause the frame G, screw shaft 55 and pivot 57 of the sleeve 56 to oscillate the boom D about the pivot 50. Since the pivot 54 is disposed as close to the pivot 50 as is possible, the boom D will be oscillated through the greatest swing. This swing is sufficient to cause rotating circular saws K, carried at the outer end of the boom D, to swing over the tops of trees, not shown, and to cut off branches that project above the height set by the positioning of the boom D, above the ground.

The amplitude of the swing of the oscillating boom D, can be reduced by simply actuating the hydraulic motor H, for rotating the screw shaft 55 for moving the threaded sleeve 56 farther away from the frame G. This will cause the links 58 to swing about their pivots 61 and will also move the pivot point 54 farther away from the pivot 50. This in effect will increase the distance between the pivot 54 and the pivot 50 and therefore reduce the swing of the boom D on each side of the dot-dash line 60 even though the crank arm 51 is reciprocating the pitman 52 through the same length of the stroke.

It might be well to state at this point that the frame G has a bushing 62 for rotatably receiving the screw shaft 55 and thrust bearings 63 are placed at opposite ends of the bushing and are carried by the frame G so as to absorb the longitudinal thrust caused by the reciprocating screw shaft and frame as both are moved by the pitman 52. The angular positioning of the horizontal boom E to any desired angle in an arc of about 90°, and the adjustable oscillating swing of the boom D, permits a cutting area through an angle of not much more than 100°. The angular swing made by the boom D with respect to the horizontal boom E is around 40°.

If the operator wishes to cut tree portions positioned closer to the tractor A and to reduce the oscillating stroke of the boom D, he can swing the horizontal boom E, clockwise in FIGURE 2, so as to move the pivot point 50 closer to the side of the tractor. He can then actuate the hydraulic motor H for moving the threaded sleeve 56 farther away from the frame G. This will increase the distance between the pivot 54 and the pivot 50 and decrease the amplitude of the swing of the boom D. A short stroke swing of the boom D will thus be accomplished and will be made closer to the side of the tractor.

When the device is in inoperative position, the horizontal boom E is swung so as to extend rearwardly from the tower C and from the tractor A. The boom E will parallel the dot-dash line 60 when in this position. The hydraulic motor H will rotate the screw shaft 55 for moving the threaded sleeve 56 to the outer end of the screw shaft. This will swing the oscillating boom D into a parallel position with the horizontal boom E.

It is possible to tilt the device laterally on the tractor A as a unit. In FIGURE 3, we show two hydraulic cylinders 65 placed at the sides of the tractor. Both FIGURES 1 and 3 show the lower ends of the hydraulic cylinders 65 pivotally secured at 66 to the rear transverse plate 11 that in turn is secured to the rear of the tractor. Each hydraulic cylinder 65 has a piston, not shown, slidably mounted therein, and this piston is connected to a piston rod 67. The free end of each piston rod 67 is pivotally connected at 68 to a bracket 69 that is secured to the side pipe 6.

When hydraulic fluid under pressure is admitted to the bottom of the left hand cylinder 65 in FIGURE 3, through a fluid-conveying conduit 70, the piston rod 67 in this cylinder will be moved upwardly and will rock the frame B to the right in this figure. At the same time fluid is fed into the top of the right hand hydraulic cylinder 65 through the conduit 71, for moving the piston, not shown, and its rod 67, downwardly. The telescoping tower C will be swung to the right during this movement.

The oscillating boom D carries a plurality of disc saws, indicated generally at K in FIGURE 1. We illustrate two saws, but we do not wish to be confined to this number. Each saw is mounted at the lower end of a vertically disposed shaft 72 and the shaft is rotatably carried by the oscillating boom D. One of the shafts 72 may be directly connected to a hydraulic motor L and the other shaft 72 may be operatively connected to the first one by a pulley and belt drive mechanism indicated generally at 73. Any other means may be used for rotating the disc saws.

The hydraulic motor L has fluid-conveying conduits 74 and 75 communicating therewith and the fluid flowing to and from the motor may be controlled by one of the levers shown in the bank of levers 76 in FIGURES 1 and 2. The levers 76 are disposed close to a seat 77, provided for an operator at the top of the inner telescoping cylinders 28. Other levers in the bank 76 may control the flow of fluid to the two cylinders 65, used in tilting the device angularly about its longitudinal axis. The vertical movement of the inner cylinder 28 is controlled by another lever 76 that operates a valve, not shown, for admitting fluid under pressure to the vertical cylinder 42. Also the swinging of the horizontal boom E is accomplished by the hydraulic cylinder 32, and another lever 76 controls the flow of fluid to and from this cylinder. The angular positioning of the oscillating boom D, with respect to the horizontal boom E is accomplished by the hydraulic motor H, which is controlled by another lever in the bank of levers 76. The oscillation of the boom D is accomplished by the hydraulic motor F and associate mechanism. This motor F is controlled in its operation by one of the levers 76 and the valve, not shown, operated thereby.

It will be seen from this that the operator sitting in the seat 77 has full control of all of the operating parts of the device. The driver of the tractor A, sits in a driver's seat 78 and controls levers 79, see FIGURE 1, for controlling movement of the tractor. A caster wheel 80 is mounted at the rear of the tractor A, and prevents the tractor from tipping over rearwardly while it is in operation. The mounting for the caster wheel 80 includes links 81 that permit vertical movement of the wheel with respect to the tractor. A shock-absorbing coil spring 82 yieldingly holds the caster wheel 80 down upon the ground 83.

*Operation*

The operation of the device has been substantially explained throughout the foregoing description. One operator occupies the driver's seat 78, see FIGURE 1, and controls the movements of the tractor A. A second operator occupies the seat 77 at the top of the telescoping tower C and controls all hydraulic mechanisms for operating the unit. The height of the disc cutters K above the ground can be determined by the second operator. The shafts 72 for the cutters may have beaters 84 secured thereto so as to revolve with the shafts. These beaters aid in removing the material, cut by the disc saws, from the trees and will cause this material to drop onto the ground. The disc saws K could be rotated by a mechanical connection with the tractor engine if desired, rather than by the hydraulic motor L.

The horizontal boom E can be swung through an arc of about 90° and can extend rearwardly from the tower C when not in use. From this inoperative position, the boom E can be swung into a desired angular position up to a point where the boom will extend at right angles to the line of travel of the tractor. The second operator controls the swinging of the boom E through the hydraulic cylinder 32 and associate parts. The amplitude of swing of the oscillating boom D can also be controlled by the second operator and this is accomplished by the hydraulic motor H and associate parts in the manner already described. The lateral tilting of the entire unit is carried out by the hydraulic cylinders 65 under the control of the second operator.

When the device is used for topping trees, the disc saws K can be moved from a position about ten feet above the ground into a top position of sixteen feet above the ground although we do not want to be confined to these exact distances. The maximum swing of the oscillating boom D can be attained when the horizontal boom E extends at right angles to the line of travel of the tractor. The horizontal boom E can be swung rearwardly for moving the oscillating boom D to clear obstructions in its way such as power poles.

The center of gravity of the unit is always at the center and near the bottom of the tractor. The structure is relatively light and compact for the work it is intended to do. The position of the pivot for the oscilllating boom D can be moved toward or away from the center of the tractor A by merely changing the angle of the horizontal boom E.

We claim:

1. The combination with a vehicle: of
   (a) a vertical tower supported by said vehicle;
   (b) a horizontal boom having one end connected to the top of said tower and being supported thereby; said boom extending radially from said tower;
   (c) means for swinging said boom from a position in which it extends rearwardly from said tower and parallels a longitudinal axis of said vehicle into a position in which it extends laterally and substantially at right angles to said longitudinal axis;
   (d) a horizontal oscillating boom having one end pivotally connected to the outer end of said horizontal boom and being swingable in the same plane as the horizontal boom;
   (e) a plurality of disc saws rotatably carried by said oscillating boom and near its outer end;
   (f) means for rotating said disc saws; and
   (g) means for continuously swinging said oscillating boom through a desired arc with respect to said horizontal boom and about its pivotal connection at the outer end of said horizontal boom, the swinging movement being substantially transverse to the line of travel of said vehicle and at one side thereof.

2. The combination with a vehicle: of
   (a) a vertical telescoping tower having one portion supported by said vehicle and a second portion rotatably and slidably carried by the first portion;
   (b) a horizontal boom having one end connected to the top of said second portion of said tower and being supported thereby; said boom extending radially from said tower;
   (c) means for rotating the second portion of said tower for swinging said boom from a position in which it extends rearwardly from said tower and parallels a longitudinal axis of said vehicle into a position in which it extends laterally and substantially at right angles to said longitudinal axis;
   (d) a horizontal oscillating boom having one end pivotally connected to the outer end of said horizontal boom and being swingable in the same plane as the horizontal boom;
   (e) a plurality of disc saws rotatably carried by said oscillating boom and near its outer end;
   (f) means for continuously rotating said disc saws; and
   (g) means for swinging said oscillating boom through a desired arc with respect to said horizontal boom and about its pivotal connection at the outer end of said horizontal boom, the swinging movement being substantially transverse to the line of travel of said vehicle and at one side thereof.

3. The combination as set forth in claim 2: and in which
   (a) the means for swinging said oscillating boom includes means for varying the amplitude of the swing;
   (b) whereby said horizontal boom can be swung for moving the pivot point of said oscillating boom near to the side of said vehicle, and the amplitude of swing of said oscillating boom can be made smaller at the side of the vehicle; or
   (c) said horizontal boom can be swung for moving the pivot point of said oscillating boom away from the side of said vehicle, and the amplitude of swing of said oscillating boom can be made greater and at the same side of the vehicle.

4. In a device of the type described:
   (a) a vertical telescoping tower having a stationary outer cylinder mounted on a vehicle;
   (b) a circular bearing track mounted at the top of said outer cylinder;
   (c) a rotatable inner cylinder disposed within said outer cylinder and having a supporting ring at its upper end that rides on said circular bearing track for rotatably supporting said inner cylinder within said outer cylinder;
   (d) said inner cylinder having longitudinally extending keyways;
   (e) a telescoping inner cylinder slidably mounted within said rotatable inner cylinder and having keys slidable in said key-ways; whereby a rotation of said rotatable inner cylinder will also rotate said telescoping inner cylinder therewith;
   (f) means for moving said telescoping inner cylinder longitudinally within said rotatable inner cylinder so as to extend the overall height of said telescoping tower;
   (g) a horizontal boom having one end connected to the top of said inner telescoping cylinder and being supported thereby; said boom extending radially from said inner telescoping cylinder;
   (h) means for rotating said rotatable inner cylinder for rotating said telescoping inner cylinder and swinging said horizontal boom;
   (i) an oscillating boom pivotally connected to the free end of said horizontal boom and being swingable in the same plane as occupied by said horizontal boom;
   (j) means for swinging said oscillating boom through a desired arc in a back and forth movement;
   (k) a plurality of disc saws rotatably carried by said oscillating boom and near its outer end; and
   (l) means for rotating said disc saws.

5. In a device of the type described:
   (a) a vertical tower;
   (b) a horizontal boom having one end connected to the tower; said horizontal boom extending radially therefrom;
   (c) an oscillating boom having one end pivotally connected to the outer end of said horizontal boom; said oscillating boom being swingable in a horizontal plane;
   (d) a threaded sleeve pivotally connected to said oscillating boom at a point close to the pivotal connection of said oscillating boom to said horizontal boom;
   (e) a threaded screw shaft received in said threaded sleeve;
   (f) a frame mounted at one end of said screw shaft but not being rotatable with said shaft;
   (g) a hydraulic motor mounted in said frame and connected to said screw shaft for rotating it in either direction;
   (h) links pivotally connected to said frame and to said oscillating boom at a point on the opposite side of the pivotal connection between said horizontal and oscillating booms to that where said threaded sleeve is pivotally connected to said oscillating boom;
   (i) a second hydraulic motor mounted on said horizontal boom and being connected to a crank arm for rotating it; and
   (j) a pitman connecting said crank arm to said frame for reciprocating said frame and screw shaft for swinging said oscillating boom when said crank arm is operated by said second hydraulic motor;
   (k) said first hydraulic motor being operable to rotate said screw shaft in the desired direction for moving said threaded sleeve toward or away from said frame;

(1) whereby the amplitude of the swing of said oscillating boom may be varied.

6. The combination with a vehicle: of
(a) a front supporting bearing mounted at the front of said vehicle;
(b) a rear supporting bearing mounted at the rear of said vehicle; said front and rear supporting bearings having their axes aligned with each other and with a longitudinal axis that extends throughout the length of said vehicle and is disposed midway between the vehicle sides;
(c) a tower-supporting frame including a pair of pipes extending along the sides of said vehicle;
(d) a front member connected to the front ends of said pipes and having a front central sleeve that is rotatably mounted on said front bearing;
(e) a rear member connected to the rear ends of said pipes and having a rear central sleeve that is rotatably mounted on said rear bearing;
(f) a vertical tower having its lower end supported by said rear member and being supported by said tower-supporting frame;
(g) a disc saw carrying boom extending radially from the top of said tower and forming a right angle with the longitudinal axis of the tower; and
(h) means for rocking said tower-supporting frame and said pipes laterally in either direction about the aligned axes of said front and rear bearings as a unit.

7. The combination as set forth in claim 7: and in which
(a) a cover for the vehicle forming a part of said tower-supporting frame and extending throughout the length of the vehicle and is spaced above the top of said vehicle; and
(b) an inclined bracing member having its front end secured to the end of said cover that overlies the front of said vehicle; said bracing member extending upwardly and rearwardly and having its opposite end secured to said tower and near the top of the tower; and
(c) a reinforcing web having its edges secured to said bracing member, the top of said cover, and to said tower;
(d) whereby said bracing member and said web perform the additional function of diverting any material falling onto the vehicle, to the sides of the vehicle; said cover having a convex upper surface so that material falling thereon will be caused to move to the cover side edges and drop past the vehicle sides.

8. In a device of the type described:
(a) a vertical telescoping tower having a stationary outer cylinder mounted on a vehicle;
(b) a rotatable inner cylinder rotatably mounted within said outer cylinder;
(c) a telescoping inner cylinder slidably mounted within said rotatable inner cylinder;
(d) means for moving said telescoping inner cylinder longitudinally within said rotatable inner cylinder so as to extend the overall height of said telescoping tower;
(e) a horizontal boom having one end connected to the top of said inner telescoping cylinder and being supported thereby; said boom extending radially from said inner telescoping cylinder;
(f) means for rotating said rotatable inner cylinder for rotating said telescoping inner cylinder and swinging said horizontal boom;
(g) an oscillating boom pivotally connected to the free end of said horizontal boom and being swingable in the same plane as occupied by said horizontal boom;
(h) means for swinging said oscillating boom through a desired arc in a back and forth movement;
(i) a plurality of disc saws rotatably carried by said oscillating boom and near its outer end; and
(j) means for rotating said disc saws.

9. In a device of the type described:
(a) a vertical telescoping tower having a stationary outer cylinder mounted on a vehicle;
(b) an intermediate cylinder rotatably mounted within said outer cylinder and having longitudinally extending keyways;
(c) a telescoping inner cylinder having keys slidable in the keyways of said intermediate cylinder;
(d) a disc saw carrying boom connected to the top of said telescoping inner cylinder;
(e) means for raising said inner cylinder for lifting said boom to a desired height; and
(f) means for rotating said intermediate cylinder for rotating said telescoping inner cylinder for swinging said boom into a desired angular position.

References Cited by the Examiner

UNITED STATES PATENTS

| 2,104,764 | 1/38 | Sanders et al. | 74—42 |
| 2,411,623 | 11/46 | Jaques | 143—43 |
| 2,463,232 | 3/49 | Zimicki | 143—46 |
| 2,787,298 | 4/57 | Le Tourneau | 143—46 |
| 2,926,480 | 3/60 | Kimball | 56—235 |
| 2,940,486 | 6/60 | Whitmore | 143—43 |

FOREIGN PATENTS

| 715,523 | 9/54 | Great Britain. |

ROBERT C. RIORDON, *Primary Examiner.*

WILLIAM W. DYER, Jr., *Examiner.*